(12) United States Patent
Fenwick et al.

(10) Patent No.: US 8,125,977 B2
(45) Date of Patent: Feb. 28, 2012

(54) SYNCHRONIZATION OF COMPUTER SYSTEM CLOCK USING A LOCAL GATEWAY

(75) Inventors: Stephen C. Fenwick, Mountain View, CA (US); James Woodyatt, San Francisco, CA (US); Robert Newberry, San Jose, CA (US); Sandeep Parikh, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/006,332

(22) Filed: Jan. 13, 2011

(65) Prior Publication Data

US 2011/0110360 A1    May 12, 2011

Related U.S. Application Data

(62) Division of application No. 10/917,624, filed on Aug. 13, 2004, now Pat. No. 7,873,024.

(51) Int. Cl.
*H04J 3/06* (2006.01)

(52) U.S. Cl. .................................. 370/350; 324/503
(58) Field of Classification Search .................. 370/350
See application file for complete search history.

(56) References Cited

U.S. PATENT DOCUMENTS

| 6,725,278 B1 | 4/2004 | Gonzalez | |
| 2003/0084190 A1* | 5/2003 | Kimball | 709/248 |

\* cited by examiner

*Primary Examiner* — Kamran Afshar
*Assistant Examiner* — Sayed T Zewari
(74) *Attorney, Agent, or Firm* — Blakely, Sokoloff, Taylor & Zafman, LLP (57) ABSTRACT

Methods and apparatuses for synchronizing a system clock of a computer via a local gateway are described herein. In one embodiment, a local clock of a gateway device is periodically synchronized with a remote time service facility over an external network. The synchronized local clock of the gateway device is then used to synchronize a system clock of one or more clients over a local network without having the clients individually to access the remote time service facility. Other methods and apparatuses are also described.

28 Claims, 9 Drawing Sheets

SYNCHRONIZATION OF COMPUTER SYSTEM CLOCK USING A LOCAL GATEWAY

This application is a divisional of U.S. patent application Ser. No. 10/917,624, filed on Aug. 13, 2004 now U.S. Pat. No. 7,873,024.

FIELD OF THE INVENTION

The present invention relates generally to computer networks. More particularly, this invention relates to synchronization of computer system clocks using a local gateway.

BACKGROUND OF THE INVENTION

Most conventional computer systems maintain an internal clock to keep track of the time of day. Accurate time of day measurements are required in a wide variety of applications, such as, managing and tracking electronic mail (email), timing back-ups of data on a network, synchronizing communications between clients and servers, and managing multimedia teleconferences. Because the time clocks maintained by most computer systems tend to be subject to a certain amount of error or "drift", it becomes necessary to synchronize such clocks to an accurate reference clock from time to time to maintain their accuracy.

Various solutions have been developed to synchronize the time clock of a computer system. A simple method is for the user of a computer system to manually adjust the clock whenever the clock appears to have drifted. This technique, however, is both inconvenient for the user and subject to its own inaccuracies. A more sophisticated solution makes use of a server computer system operating on a network, such as the Internet. The server maintains a highly accurate time clock, such as an atomic clock, and provides accurate time readings to other computer systems on the network using a communication protocol, such as, Network Time Protocol (NTP).

A client computer system may send a request for an accurate time reading via the Internet to an NTP server when it is necessary to synchronize its internal clock. The request may be routed to one of a number of secondary servers that function as intermediaries between client systems requiring clock synchronization and a primary NTP server. The use of such secondary servers is intended to reduce the loading on the primary NTP server. A primary NTP server may be maintained, for example, by a government entity such as the U.S. Navy, while access to the primary NTP server is regulated by secondary NTP servers maintained by universities and business enterprises for use by their students and employees, respectively.

However, as the number of client computers increases, particularly, in a local area network and each of the client computer has to access the NTP server or the secondary NTP server (e.g., NTP proxy server), in order to synchronize their respective system clocks, the traffic to the NTP servers and/or proxy servers may still be significant and sometimes such traffic would cause significant delay.

SUMMARY OF THE INVENTION

Methods and apparatuses for synchronizing a system clock of a computer via a local gateway are described herein. In one embodiment, a local clock of a gateway device is periodically synchronized with a remote time service facility over an external network. The synchronized local clock of the gateway device is then used to synchronize a system clock of one or more clients over a local network without having the clients individually to access the remote time service facility over the external network.

More generally, a device connected to a local network (including, for example, a gateway device) can synchronize with data from a resource located on an intermittently available external network. The local network device can make that data available to other devices of the local network making the local network devices' access to the "virtual" network resource unbroken, even when the local network is not internetworked with the external network.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Methods and apparatuses for synchronizing data on a local network connected device with an external network connected resource are described herein. The methods and apparatuses include mechanisms for synchronizing despite the existence of an intermittent connection between the local network and the external network. Specifically, when the external network is available, the local network connected device is synchronized to data from the external network connected resource Otherwise the local network connected device is synchronized to data generated by another local network connected device to imitate data normally available from the network resource. By way of example, these methods and apparatuses are described with reference to an NTP server and a gateway.

In one embodiment, a gateway device of a local network (e.g., a home network) includes an NTP compatible client and an NTP compatible server (also referred to as a NTP compatible service agent). The NTP client of the gateway device periodically synchronizes a local clock of the gateway device with a reference clock of a remote time service provider (e.g., an NTP server or an NTP proxy server) over an external network (e.g., the Internet). Subsequently, the NTP server of the gateway device may provide time services to one or more clients over the local network using the synchronized local clock to allow the one or more clients to synchronize their respective system clock with the gateway device. As a result, the clients do not have to individually access the remote time service provider over the external network in order to synchronize their respective local clocks, and the overall traffic to the remote time service server would be greatly reduced.

In a particular embodiment, the gateway device may be an access point of a wireless local area network (WLAN), also referred to as a base station, using a variety of wireless protocols; for example, IEEE 802.xx protocols. In a further embodiment, the access point includes a modem which may be used to access the external network via a dialup network service. The modem may be shared by multiple clients of the local network.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system; or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated, that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); a random access memory ("RAM"); a magnetic disk storage media; an optical storage media; a flash memory device; electrical, optical, acoustical, or other form of propagated signals (e.g., carrier waves, infrared signals, digital signals, etc.).

Figure 1:
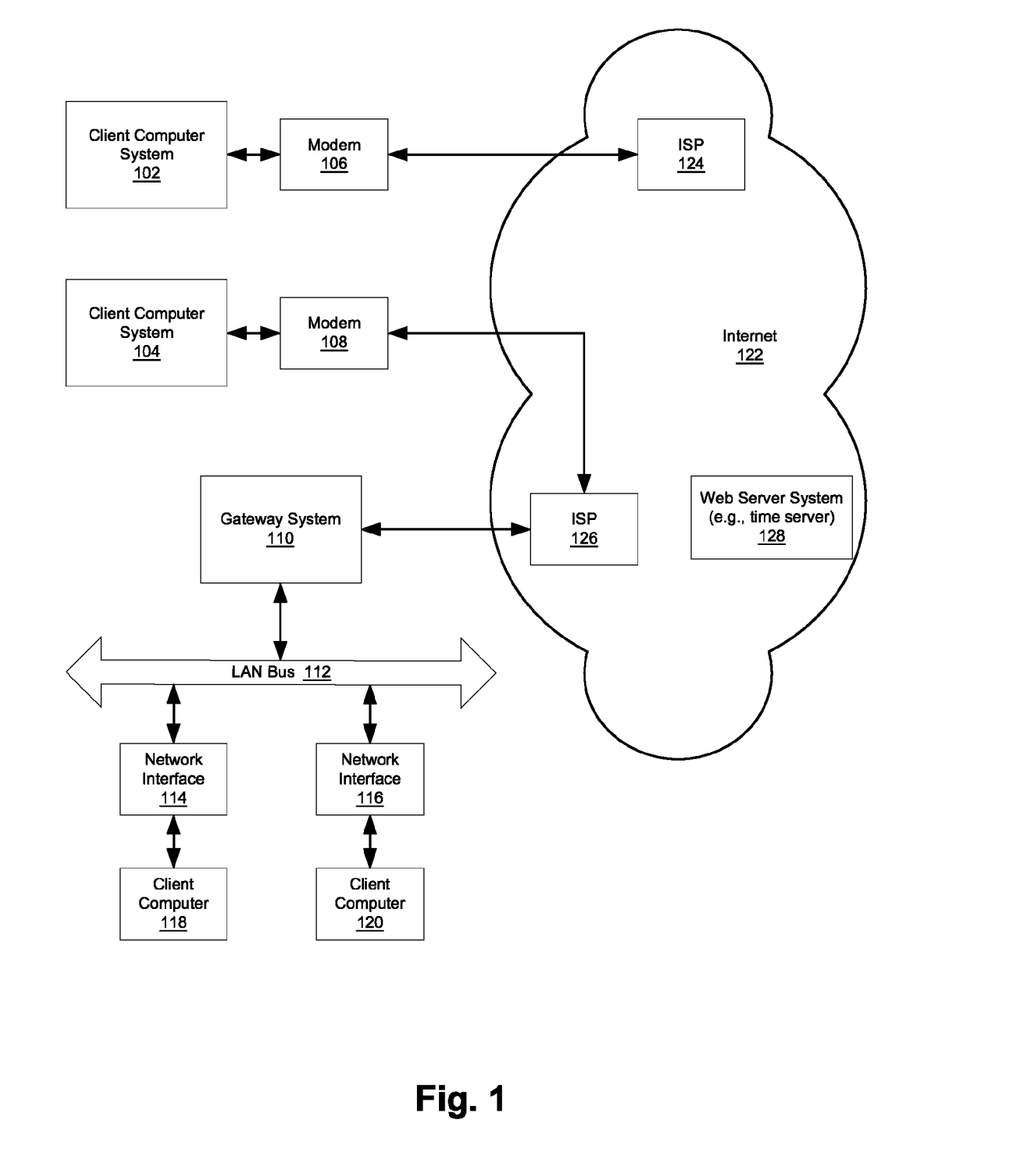
FIG. 1 is a diagram of a network of computer systems in which a gateway device may includes a network time protocol (NTP) proxy server to provide time services for its local clients.

FIG. 1 is a diagram of a network of computer systems in which a gateway device may include a network time protocol (NTP) compatible server or proxy server to provide time services for its local clients. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI. The physical connections of the Internet and the protocols and communication procedures of the Internet are well known to those in the art. It will be also appreciated that such systems may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application, without requiring a network connection.

The Web server 128 typically includes at least one computer system to operate with one or more data communication protocols, such as the protocols of the World Wide Web and, as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML document (e.g., Web pages), which may be provided by the Web server 128.

The ISP 124 provides Internet connectivity to the client computer system 102 via a modem interface 106, which may be considered as part of the client computer system 102. The client computer systems 102, 104, 118, and 120 may be a conventional data processing system, such as a Power Mac G5 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system.

The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system.

The server 128 may be a network time server or a network time proxy server, as time.apple.com, that is capable of providing time services to one or more clients; such as, clients 102, 104, 118, and 120, over the network 122 using a protocol compatible with the NTP protocol. Typically, when a client needs to update its system clock, each client has to access the NTP server 128 to synchronize the system clock of the respective client. For example, clients 118 and 120 have to individually access server 128 to synchronize their system clock, respectively. As the number of the clients is getting large, the amount of traffic accessing server 128 will become significant. Sometimes, such traffic causes undesirable network congestion in order to obtain the correct time information. In addition, when some clients use dialup network services, each client has to dial out to the NTP server using a modem. As a result, multiple calls have to be made for multiple clients. If the dialup network services are obtained through a long distance call, the cost for synchronizing the system clock of a client may significantly go up.

As a result, according to one embodiment, the gateway system 110 for multiple clients 118 and 120 over the LAN 112 may include a clock synchronizer as an NTP compatible client to periodically synchronize the system clock of the gateway 110 with the NTP server 128. Such clock synchronization may be performed whenever the gateway 110 determines that there is such a need. Alternatively, the clock synchronization may be performed in response to a request from at least one of the clients 118 and 120 over the local network 112.

Once the gateway 110 synchronizes the local clock with the NTP server 128, subsequently, in response to a request from at least one of the clients 118 and 120 for synchronizing the system clock of the respective client, the gateway 110 may provide time services to the requesting client using the synchronized local clock without having to access the NTP server 128 over the external network 122. As a result, the clients 118 and 120 do not have to access the NTP server 128 in order to synchronize their system clocks and the traffic to the NTP server 128 would be greatly reduced. Further, synchronizing clocks from gateway 110 will be performed in a much more efficient manner with a lower cost. As a result, such a configuration improves the scalability of the network time synchronization services of large service providers by consolidating substantially all clients of a local area network into one client at the demarcation point.

In one embodiment, the local area network 112 may be local wireless network (e.g., a home network) and the gateway 110 may be a wireless access point (also referred to as a base station) to one or more clients 118 and 120 using a variety of wireless networking protocols; for example, the IEEE 802.xx protocols including Wi-Fi and/or Bluetooth protocols. In a further embodiment, the gateway 110 may access the server 128 via dialup network services using a modem. Other configurations may exist.

In addition, according to one embodiment, the connection between a local gateway device and a remote facility over an external network (e.g., Internet) may be a wireless connection; for example, a satellite or an IEEE 802.16 connection. Further, for the purposes of illustrations, throughout this application a modem is used as an example of a communication device that a local gateway may use. However, it is not so limited. It will be appreciated that other metered bandwidth connections or communication devices may be utilized. For example, an IEEE 802.16 connection and/or analog/digital wireless connection via a cellular phone may be utilized. These connections may include a payment scheme that is charged based on the bandwidth consumed (also referred to as metered bandwidth connections). As a result, under such circumstances, it is desirable to consume less bandwidth for housekeeping duties, such as, setting the client clocks.

Further, even for "unlimited" bandwidth network connections (e.g., broadband connections), for example, DSL (digital subscriber line) or cable modem connections, the above described techniques may provide advantages to the ISPs, such that the ISPs may have fewer connections from the clients to timer servers. For example, many ISPs use PPPoE or PPPoA for their DSL services; having fewer connected customers means more open interfaces (e.g., ports) for other customers (or the requirement for fewer interfaces, and/or less hardware, etc.) Similarly, for dial-in customers, the ISPs need fewer modems and less space in their central offices or other facilities.

Furthermore, according to one embodiment, gateway 110 can be proxies for other gateway devices. For example, device 118 may be another gateway serving as a proxy for one or more other clients. The clients of device 118 may synchronize their local clocks with device 118 without having to access gateway 110. That is, device 118 may be both a client to the gateway 110 and a gateway device to one or more other downstream devices, which may be an endpoint device that has no more downstream device. As a result, the network traffic to the gateway 110 may be greatly reduced.

Alternatively, device 118 may be just a peer in a peer-to-peer network that is capable of providing time services for other peers in the network. That is, once a peer synchronizes its local clock, other peers in the network may subsequently synchronize their local clocks with that peer without having to access the remote time facility outside of the peer-to-peer network. Further, according to one embodiment, if the external network connection is available, each of the peers may individually and directly obtain the time services from a remote time service facility over the external network. However, when the external network connection is unavailable, the peers of the peer-to-peer network may communicate with each other and may synchronize their clock from one or more of their fellow peers. For example, a peer that needs to synchronize its system clock may send a broadcast message to the rest of the peers. In response to the broadcast message, each of the peers may respond with its time service information to allow the requested peer to determine which of the peers has newest time service information and to synchronize its system clock using the newest one. Other mechanisms may be utilized.

According to one embodiment, gateway 110 includes both server and client functionalities (e.g., NTP compatible server and NTP compatible client functionalities) that is capable of obtaining time services from a remote time service facility over an external network and providing time services to its downstream clients over a local network using the obtained time services, even when a network connection to the external network is unavailable. That is, gateway 110 acts as a persistent "virtual" NTP server which is available even if the external connection is unavailable (e.g., broken or busy). Although gateway 110 functionalities have been described by way of example using NTP related resources, they are not so limited. Other types of resources, for example, Web pages or distributed applications, etc., may be obtained by the gateway 110 when the external network connection is available and the gateway 110 may provide those resources to its downstream clients even when the external network connection is unavailable.

Figure 2:
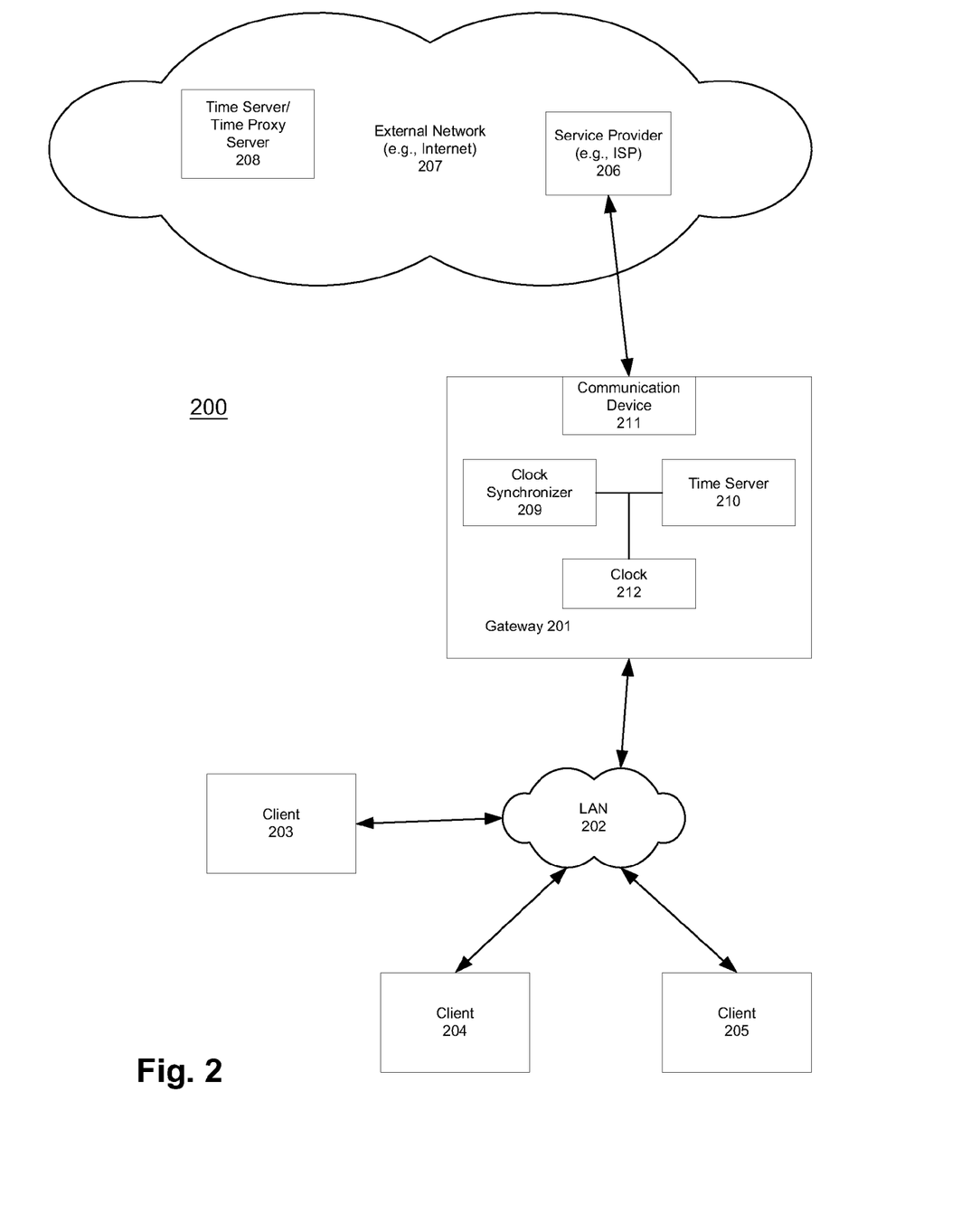
FIG. 2 is a block diagram illustrating an exemplary network configuration according to one embodiment of the invention.

FIG. 2 is a block diagram illustrating an exemplary network configuration according to one embodiment of the invention. Referring to FIG. 2, in one embodiment, the exemplary configuration 200 includes a gateway 201 providing gateway services for one or more clients 203-205 over a local area network 202. In order to access a remote facility, such as NTP server or proxy server 208, over an external network 207, each of the clients 203-205 has to go through gateway 201 and, optionally, the network service provider 206 (e.g., an Internet service provider).

In one embodiment, the gateway 201 includes, but is not limited to, a clock synchronizer to synchronize a local clock with a remote time service facility via a network connection over an external network; and a time service agent coupled to the clock synchronizer to provide time services to one or more clients over a local network, using the synchronized local clock, to enable the clients to synchronize system clocks of the clients without having to access the remote time facility again.

Referring to FIG. 2, according to one embodiment, the gateway 201 includes a communication device 211 (also referred to as a network interface) to communicate with external facilities (e.g., NTP server 208 and/or ISP 206 of the external network 207), a clock synchronizer 209, and a time service agent 210. In one embodiment, the communication device 211 may be an analog modem which may be used to access the external network 207 via dialup network services. Alternatively, the communication device 211 may be a cable modem or a DSL (digital subscriber line) modem for broadband connections. Other communication devices; for example, an ISDN (integrated service digital network) modem, may be utilized. The connection between the gateway 201 and the external network 207 may be a wired connection. Alternatively, such a connection may be a wireless connection; for example, a satellite or an IEEE 802.16 connection.

In one embodiment, the external network 207 may be a wide area network (WAN), such as, for example, the Internet. The LAN 202 may be a home network. Alternatively, the LAN 202 may be a local network within an organization (e.g., an Intranet). The LAN 202 may be a wired or wireless network, or a combination of both, using a variety of network protocols, such as, Ethernet and/or IEEE 802.xx compatible protocols, such as, for example, Wi-Fi and/or Bluetooth protocols. Wireless connections may include both RF and non-RF links, for example, an IR link. Wired connections may include both electrical and non-electrical links, for example, fiber optic links.

In one embodiment, the clock synchronizer 209 may access the time service facility 208 over the external network 207 using certain network time related protocols. For example, the timer server/time proxy server 208 may be a NTP compatible NTP server or proxy server and the clock synchronizer 209 of gateway 201 may be a NTP compatible client. The clock synchronizer may access the time server 208 to synchronize a local clock 212 of the gateway 201 using NTP protocols. The local clock 212 may be a software clock (e.g., clock 406A of FIG. 4), a hardware clock (e.g., clock 406B of FIG. 4), or a combination of both.

The local clock 212 may be synchronized periodically, for example, whenever there is such a need determined by the gateway 201. For example, the gateway 201 may determine that the local clock 212 may have drifted since the last clock synchronization. In response to the determination, the clock synchronizer 209 may access the time server 208 to obtain a new clock and synchronize the local clock 212 with the new clock. Alternatively, the local clock 212 may be synchronized in response to a request from a client, such as clients 203-205, for synchronizing the system clocks of the clients.

Furthermore, the local clock 212 of gateway 201 may be synchronized by sharing a network connection established by a client. That is, when a client establishes a network connection via the service provider 206 to access a remote facility over the external network 207, the gateway 201 may use the same connection to access the time server 208 to synchronize the local clock 212 of the gateway 201. As a result, if the connection between the service provider 206 and the gateway 201 is a long distance dialup network connection, the gateway 201 may save a long distance call without having to individually establish a connection to access the time server 208 in order to synchronize the local clock 212 of the gateway 201.

According to another embodiment, the gateway device 201 may include a host configuration agent that provides a host configuration with a route for a client of the local network to the external network. The host configuration agent may be a utility application executed within the gateway device 201 that includes signaling functionality with respect to the external network and the dynamic host configuration functionality for the local network, such as, for example, a DHCP (dynamic host configuration protocol) server. In one embodiment, the host configuration directs a client of the local network to the gateway's time server for the time synchronization services. In a particular embodiment, such configuration can be specified via a time server option of the host configuration, such as, for example, a DHCP time server option. That is, in addition to the NTP server, the gateway device may further include a DHCP server functionality to provide host configuration to its clients over the local network. Specifically, the host configuration utility may provide an option to its clients to access the time server of the gateway device or alternatively, an external time server over the external network, to synchronize their local clocks. According to one embodiment, a client may ignore (e.g., override) the host configuration that directs the time service requests to the local time server of the gateway and still access the external time server over the external network.

Further, as described above, gateway 201 may be proxies for other gateway devices. For example, client device 204 may be another gateway serving as a proxy for one or more other clients (not shown). The clients of device 204 may synchronize their local clocks with device 204 without having to access gateway 201. Alternatively, device 204 may be just a peer in a peer-to-peer network that is capable of providing time services for other peers in the associated network. Other configurations may exist.

Figure 3:
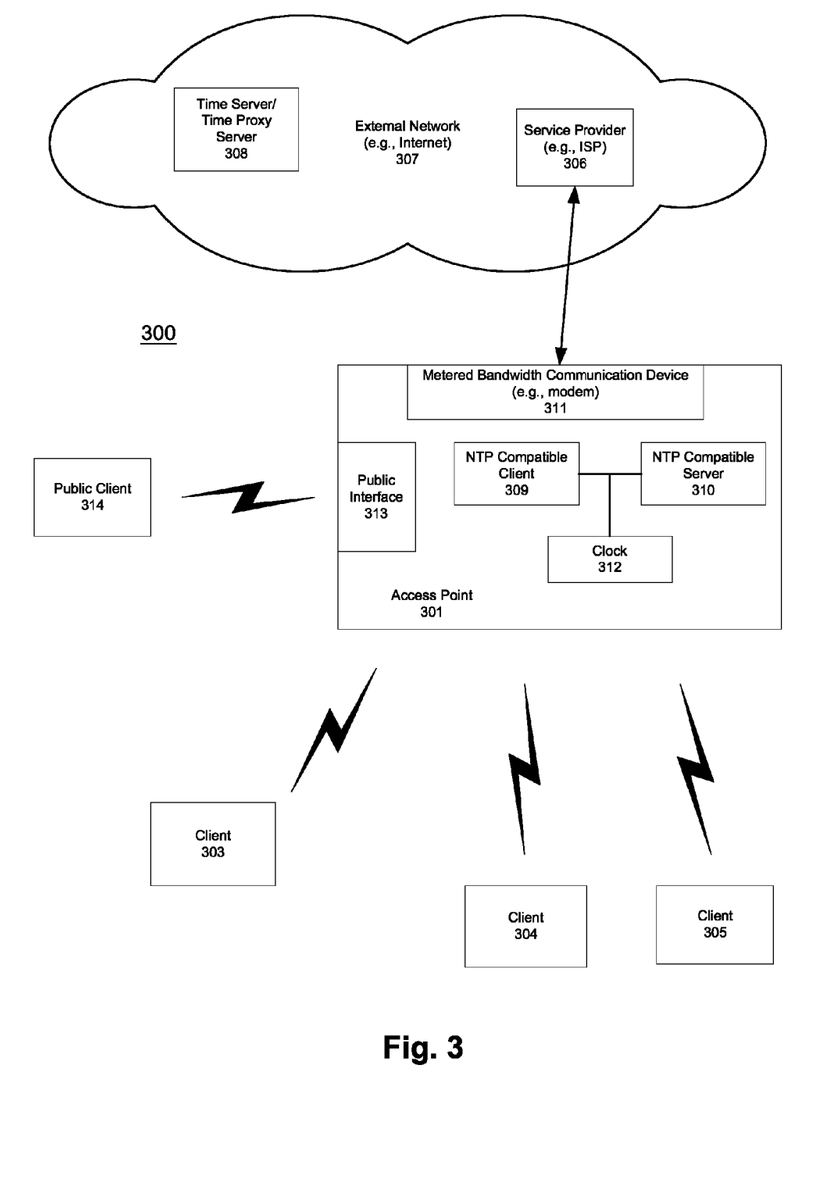
FIG. 3 is a block diagram illustrating an exemplary network configuration according to another embodiment of the invention.

FIG. 3 is a block diagram illustrating an exemplary network configuration according to another embodiment of the invention. Referring to FIG. 3, similar to network configuration 200 of FIG. 2, according to one embodiment, the exemplary configuration 300 includes a gateway 301 providing gateway services for one or more clients 303-305 over a local area network. In order to access a remote facility, such as NTP server or proxy server 308, over an external network 307, each of the clients 303-305 has to go through gateway 301 and optionally the network service provider 306 (e.g., an Internet service provider). In this embodiment, the local area network (LAN) is a wireless local area network (WLAN). In a particular embodiment, the WLAN may be a home network using a variety of wireless protocols, such as, for example, IEEE 802.xx, which may include Wi-Fi and/or Bluetooth protocols. The gateway 301 functions as an access point for the WLAN.

In one embodiment, the access point 301 includes, but is not limited to, a network time protocol (NTP) client capable of periodically synchronizing a local clock with a remote NTP server over an external network, and a NTP server coupled to the NTP client, the NTP server capable of providing time services to one or more clients wirelessly over a local network using the local clock synchronized with the remote NTP server, in response to a request to synchronize a system clock of a client without having to access the remote NTP server again.

Since an access point itself typically needs accurate time for a variety of reasons, such as, for example, logging events related to the operations of the gateway, it can also provide time services to the clients communicatively coupled to the access point. As a result, this would reduce the number of NTP requests going out over the external network connection, especially reducing additional dialup network connections for modem users.

Referring to FIG. 3, according to one embodiment, the access point 301 includes a metered bandwidth communication device 311 (e.g., modem) to communicate with external facilities (e.g., NTP server 308 and/or ISP 306 of the external network 307) using a metered network service (e.g., a dialup network service), an NTP compatible client 209, and an NTP compatible server 310 (also referred to as a time service agent).

In one embodiment, the external network 307 may be a wide area network (WAN), such as, for example, the Internet. The WLAN may be a home network. Alternatively, the WLAN may be a local network within an organization (e.g., an Intranet). In one embodiment, the NTP client 309 may access the time service facility 308 over the external network 307 using NTP protocols. The connection between the access point 301 and the external network 307 may be a wired connection. Alternatively, such a connection may be a wireless connection, for example, a satellite or an IEEE 802.16 connection.

The local clock 312 may be synchronized periodically, for example, whenever there is such a need determined by the access point 301. For example, the access point 301 may periodically determine that the local clock 312 may have drifted since the last clock synchronization. In response to the determination, the NTP client 309 may access the time server 308 to obtain a new clock and synchronize the local clock 312 with the new clock. Alternatively, the local clock 312 may be synchronized in response to a request from a client, such as clients 303-305, for synchronizing the system clocks of the clients. The local clock 312 may be a software clock (e.g., clock 406A of FIG. 4), a hardware clock (e.g., clock 406B of FIG. 4), or a combination of both.

In addition, the local clock 312 of the access point 301 may be synchronized by sharing a network connection established by a client. That is, when a client establishes a network connection (e.g., a dialup network connection using modem 311) via the service provider 306 to access a remote facility over the external network 307. The access point 301 may use the same connection to access the time server 308 to synchronize the local clock 312 of the access point 301. As a result, if the connection between the service provider 306 and the access point 301 is a long distance dialup network connection, the access point 301 may save a long distance call without having to individually establish a connection to access the time server 308 in order to synchronize the local clock 312 of the access point 301.

In one embodiment, a user or an administrator of the WLAN may configure the access point 301 to access the NTP service provider 308 for the purposes of synchronizing the local clock of the access point. The access point 301 periodically communicates with the specified time server 308 over the external network 307 using NTP compatible protocols to set its own time. Subsequently and independently, if any of the clients 303-305 of the WLAN specifies the access point 301 as their time server, then the access point 301 may supply the current time to those clients without having those clients to access the remote time server 308 over the external network 307.

Further, as described above, access point 301 may be proxies for other gateway devices. For example, client device 304 may be another gateway serving as a proxy for one or more other clients (not shown). The clients of device 304 may synchronize their local clocks with device 304 without having to access the access point 301. Alternatively, device 304 may be just a peer in a peer-to-peer network that is capable of providing time services for other peers in the associated network.

Furthermore, the access point 301 may optionally includes a publish interface 313, which may be logical port of the access point 301. The public interface 313 may be used by one or more public clients 314 to access the access point 301 for the purposes of synchronizing a system clock of the public client 314. That is, the public client 314 may not need to be a member of the WLAN host by the access point 301. However, the public client 314 may access the access point 301 via the public interface 313 only to synchronize its system clock. The public client 314 cannot access other areas via the access point 301; for example, the external network 307 and/or other clients 303-305.

The public client 314 may be a gateway or proxy for additional public clients, which forms another publicly accessible sub-network. The public clients, in sufficient proximity, could form a redundant mesh of time proxies, acting only as time proxies and/or servers without allowing other information to be communicated (as with public client 314 accessing the access point 301). Other configurations may exist.

Figure 4:
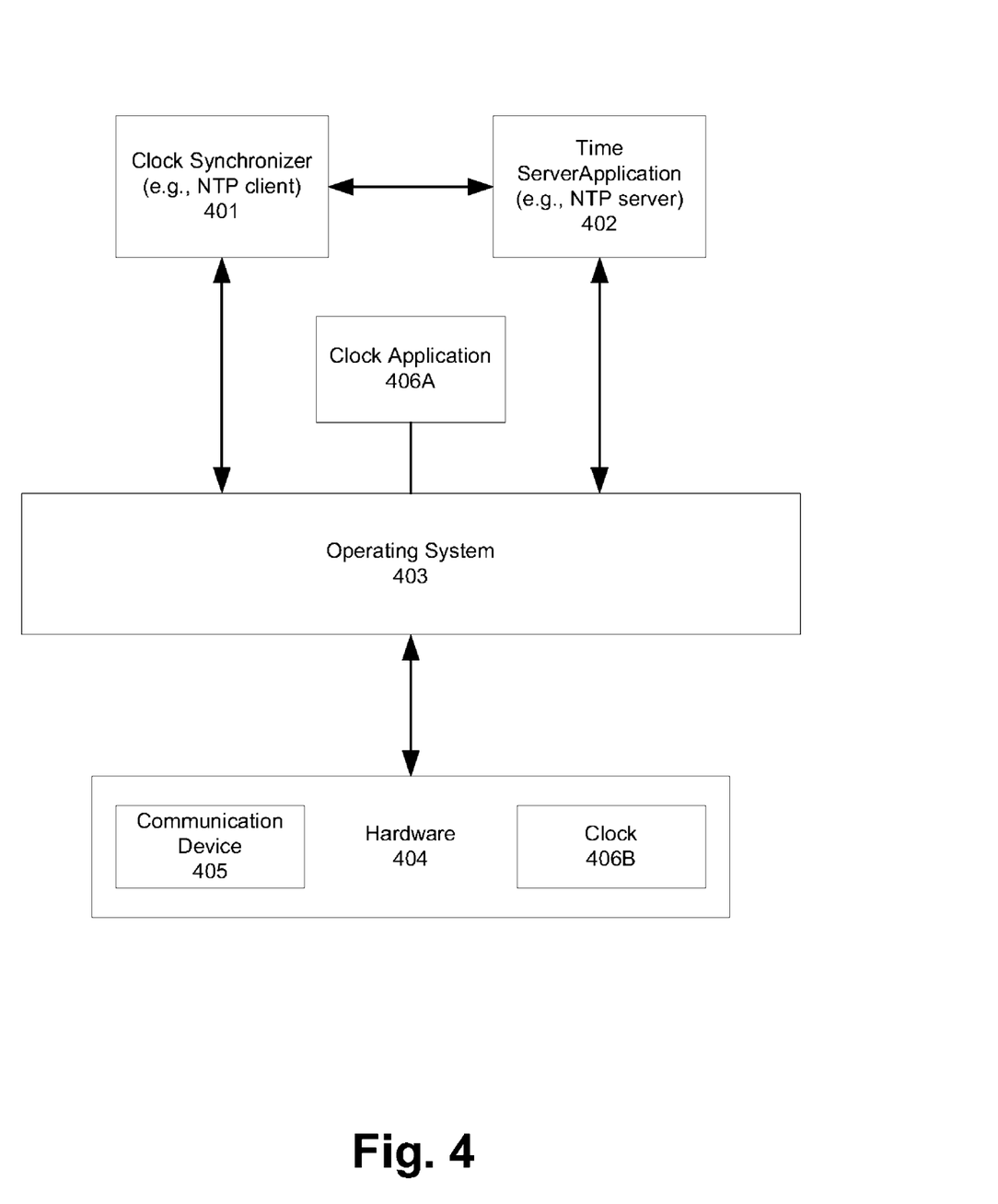
FIG. 4 is a block diagram illustrating exemplary internal components of a system representing a gateway device and/or a client computer system according to one embodiment.

FIG. 4 is a block diagram illustrating exemplary internal components of a system representing a gateway device and/or a client computer system according to one embodiment. In one embodiment, the exemplary system includes operating system software 403, which controls the computer system hardware 404 in response to execution of various software applications, including a clock synchronizer 401 and optionally a time server application 402. Hardware 404 may represent any or all of the components shown in FIG. 7, particularly a communication device 405 and a local clock 406A, 406B, or a combination of both. Not shown herein are the various software drivers which enable the operating system 403 to communicate with components of the hardware 404.

The operating system 403 may be an operating system from variety of vendors, such as, for example, a Mac OS from Apple Computer of Cupertino, Calif., or a Windows operating system from Microsoft Corporation of Redmond, Wash. Alternatively, the operating system 403 may be a Unix or Linux operating system. Other operating systems, such as, for example, an embedded or a real-time operating system may be utilized.

In one embodiment, the exemplary system 400 may represent a gateway device, such as, for example, the gateway device 201 of FIG. 2 and/or an access point 301 of FIG. 3. In one embodiment, the clock synchronizer 401 may be NTP compatible client software which may be able to access using via communication device 405 a remote NTP facility over an external network (e.g., external network 307 of FIG. 3) to synchronize the local clock 406A, 406B, or a combination of both. Note that a local clock may be referred to herein as a software clock (e.g., clock application 406A) or a hardware clock (e.g., clock 406B). Alternatively, the local clock may be referred to herein as a combination of both software clock 406A and hardware clock 406B. Throughout the application, for the purposes of illustrations, a local clock may simply be referred to as clock 406, which may be referred to as any one of clocks 406A and 406B, or a combination of both. The synchronization of the local clock 406 may be performed periodically. Once the local clock 406 has been synchronized, in response to a request from a client (e.g., clients 303-305 of FIG. 3), the time server application 402 is invoked to provide time services to the client using the synchronized local clock 406. The clock synchronizer 401 and the time server application 402 may be executed via separate thread independently.

In one embodiment, without the optional time server application, the exemplary system 400 may represent a client computer. The exemplary system 400 may be one of the clients 203-205 of the LAN 202 of FIG. 2. In one embodiment, the clock synchronizer 401 and/or the operating system 403 may be configured to have the respective gateway device 201 as its NTP server or NTP proxy server. When exemplary system 400, acting as a client needs to synchronize its system clock 406, the clock synchronizer 401 sends a request, in accordance with NTP protocols, to the gateway device to obtain a new clock and use the new clock to synchronize its local clock 406.

Alternatively, the configuration of the client computer may be substantially the same as an ordinary client computer that has been configured to have a NTP server as the remote NTP (e.g., time.apple.com). However, any attempt to access the NTP remote server, for example, using NTP protocols, may be intercepted by the gateway device and the gateway device may act as a NTP server and/or proxy server to provide time services to the client transparently, without acknowledging of the respective client. Other configurations may exist.

Figure 5:
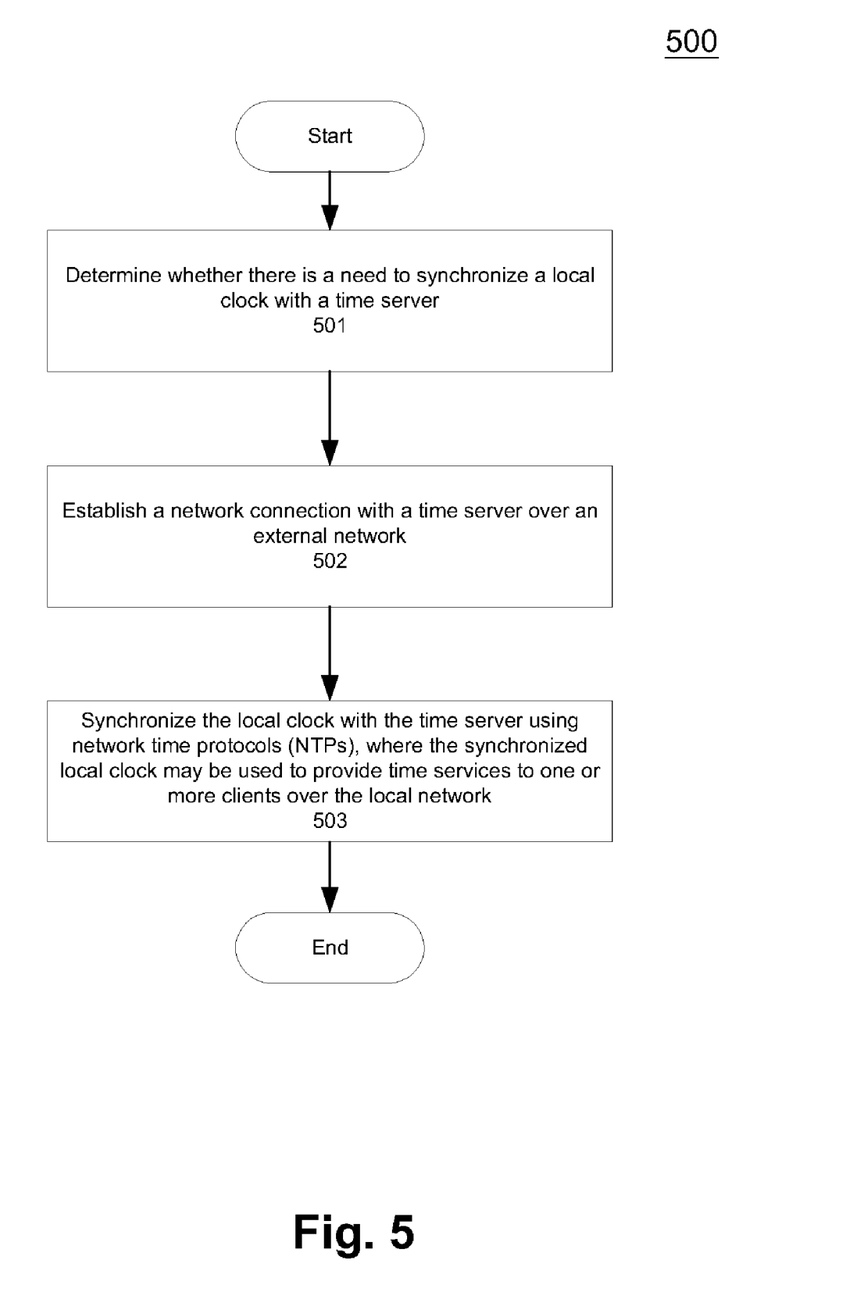
FIG. 5 is a flow diagram illustrating an exemplary process for synchronizing a local clock of a gateway device in accordance with one embodiment of the invention.

FIG. 5 is a flow diagram illustrating an exemplary process for synchronizing a local clock of a gateway device in accordance with one embodiment of the invention. Exemplary process 500 may be performed by a processing logic that may comprise hardware (circuitry, dedicated logic, etc.), software (such as is run on a dedicated machine), or a combination of both. For example, the exemplary process 600 may be performed by a gateway device, such as, for example, gateway 201 of FIG. 2 or the access point 301 of FIG. 3.

In one embodiment, the exemplary process 500 includes, but is not limited to, synchronizing a local clock via a network connection with a time service facility over an external network and providing time services to a client over a local network, using the synchronized local clock to enable the client to synchronize a system clock of the client without having to access the time service facility over the external network again.

Referring to FIG. 5, at block 501, the processing logic determines whether there is a need to synchronize a local clock. Such a determination may be performed periodically or in response to a request from a client. If it is determined that there is such a need, at block 502, a network connection is established to access a time service facility over an external network, such as, for example, the Internet. In one embodiment, the network connection is established via a dialup network service using a modem. At block 503, a local clock is synchronized with the remote time service facility. In one embodiment, the local clock is synchronized in accordance with NTP protocols. The synchronized local clock may be used to provide time services to one or more clients of a local area network, in order to allow the clients to synchronize their respective system clocks without having to individually access the remote time service facility over the external network. In one embodiment, the time services are provided to the clients over the LAN in accordance with the NTP protocols. Other operations may also be performed.

Figure 6:
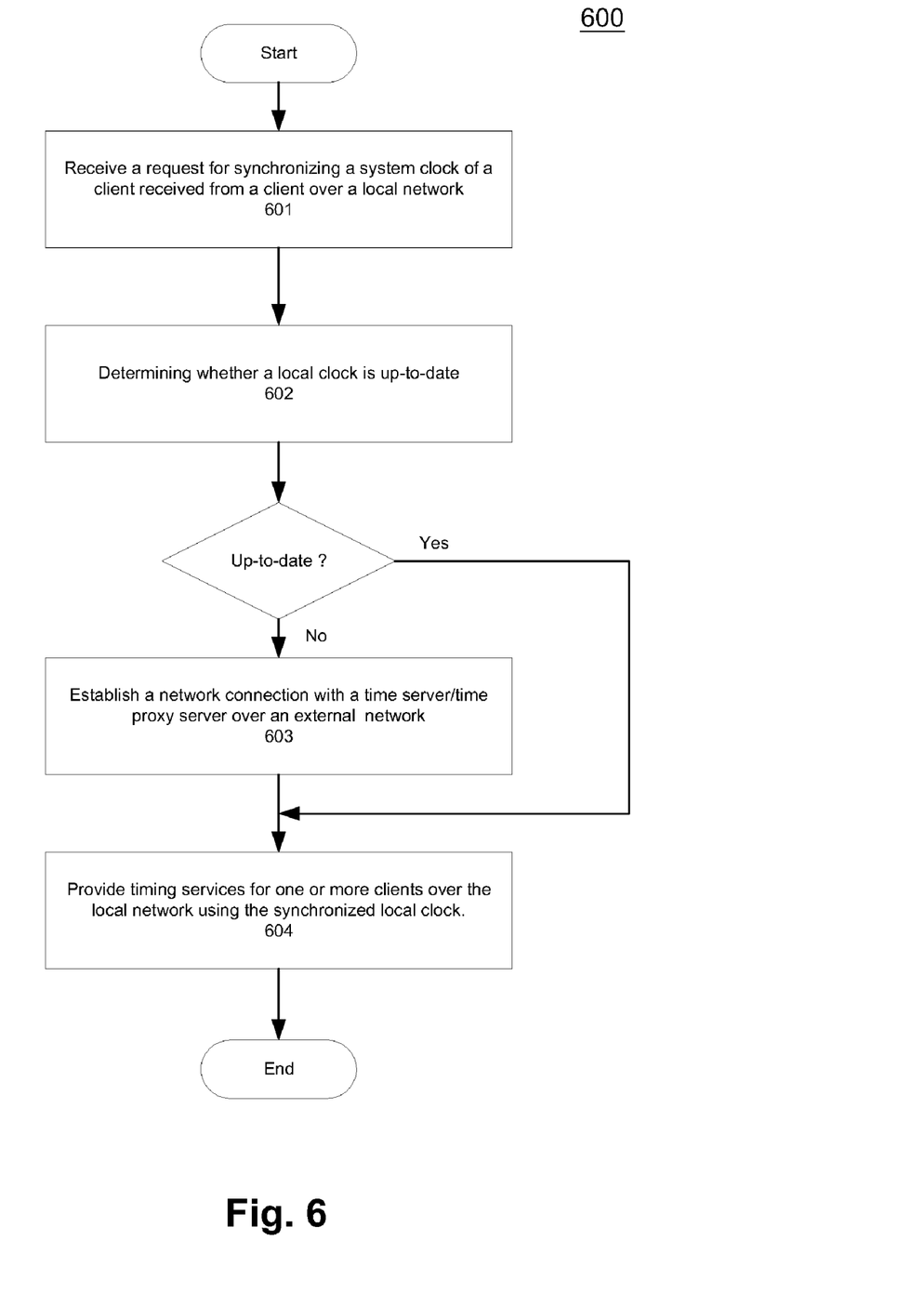
FIG. 6 is a flow diagram illustrating an exemplary process for providing time services to a client over a local area network in accordance with an embodiment of the invention.

FIG. 6 is a flow diagram illustrating an exemplary process for providing time services to a client over a local area network in accordance with an embodiment of the invention. Exemplary process 600 may be performed by a processing logic that may comprise hardware (circuitry, dedicated logic, etc.), software (such as is run on a dedicated machine), or a combination of both. For example, the exemplary process 600 may be performed by a gateway device; for example, gateway 201 of FIG. 2 or the access point 301 of FIG. 3. The exemplary process 600 may be performed independent of the exemplary process 500 using, for example, multithreading techniques.

Referring to FIG. 6, at block 601, a request for synchronizing a system clock of a client is received from a client over a local network. The local network may be a home network of an individual user. The local network may be an Intranet of an organization. In response to the request, at block 602, it is determined whether a local clock is up-to-date. Such a determination may be performed as a part of operations performed at block 501 of FIG. 5. If the local clock is not up-to-date, at block 603, a network connection is established with a remote time service facility over an external network; for example, the Internet, and the local clock is synchronized with the remote time service facility over the external network. In one embodiment, the network connection may be established via a dialup network service using a modem. The local clock may be synchronized using the NTP compatible protocols. Thereafter, at block 604, the synchronized local clock is used to provide time services to the client over the local network using, for example, NTP compatible protocols. Other operations may also be performed.

Figure 8:
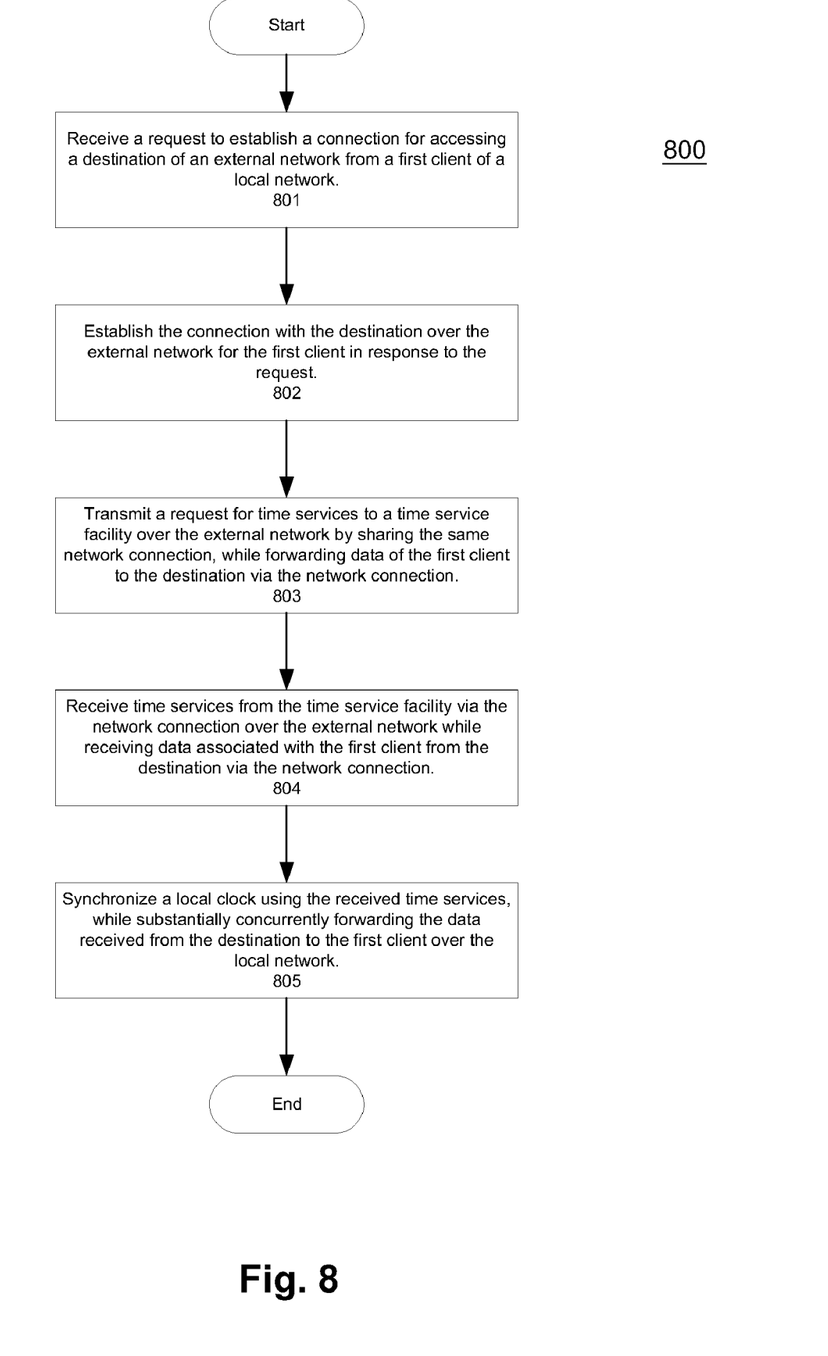
FIG. 8 is a flow diagram illustrating an exemplary process for providing time services to a client over a local area network in accordance with another embodiment of the invention.

FIG. 8 is a flow diagram illustrating an exemplary process providing time services to a client over a local area network in accordance with another embodiment of the invention. Exemplary process 800 may be performed by a processing logic that may comprise hardware (circuitry, dedicated logic, etc.), software (such as is run on a dedicated machine), or a combination of both. For example, the exemplary process 800 may be performed by a gateway device, such as, gateway 201 of FIG. 2 or the access point 301 of FIG. 3.

In one embodiment, exemplary process 800 includes, but is not limited to, synchronizing a local clock with a time service facility over an external network by sharing a network connection established for a first client of a local network to access the external network, the network connection being shared without a knowledge of the first client, and providing time services using the synchronized local clock to a second client over the local network without having to access the time service facility over the external network.

Referring to FIG. 8, at block 801, a request to establish a connection for accessing a destination of an external network (e.g., an ISP) is received from a client of a local network. In response to the request, the processing logic establishes the network connection to the external network (e.g., ISP). In one embodiment, such a connection may be a metered bandwidth connection; for example, a dialup network connection using a modem.

Once the connection has been established, at block 803, a request for time services is transmitted to a time service facility over the external network using the same connection, while the data received from the first client is transmitted to the destination via the same connection. The request for time services and the data of the first client may be transmitted substantially concurrently. Alternatively, the request for time services may be transmitted during an idle period of the first client as long as the connection is still maintained.

At block 804, the time services are received from the time service facility via the network connection over the external network, while the data associated with the first client is received from the destination over the same connection. At block 805, a local clock is synchronized using the received time services while the processing logic forwarding the data to the first client over the local network.

Subsequently, if a request for time services is received from a second client over the local network, the requested time services may be provided to the second client over the local network using the synchronized local clock without having to access the time service facility over the external network again. Other operations may also be performed.

Note, that the exemplary process 800 may be performed in conjunction with the exemplary process 600 of FIG. 6. That is, whenever the gateway device determines that there is a need to synchronize its local clock, the gateway device may share a network connection with a client of a local network that is established unrelated to the time services. This shared connection process may also be referred to as "piggyback" operations. As a result, if the connection to the external network is established through a long distance call, the local clock of the gateway device may be synchronized without an additional connection to the time service facility, which may save the additional cost related to the additional connection.

In certain embodiments, it may be possible for a gateway device to share a connection initiated by an external device of an external network, such as, a client of another network or an external server, to a client of a local network. That is, when a client of a local network receives a connection initiated from an external device over the external network, the gateway device of the local network synchronizes its own local clock from a remote time facility over the external network by sharing the same connection initiated by the external device.

Figure 9:
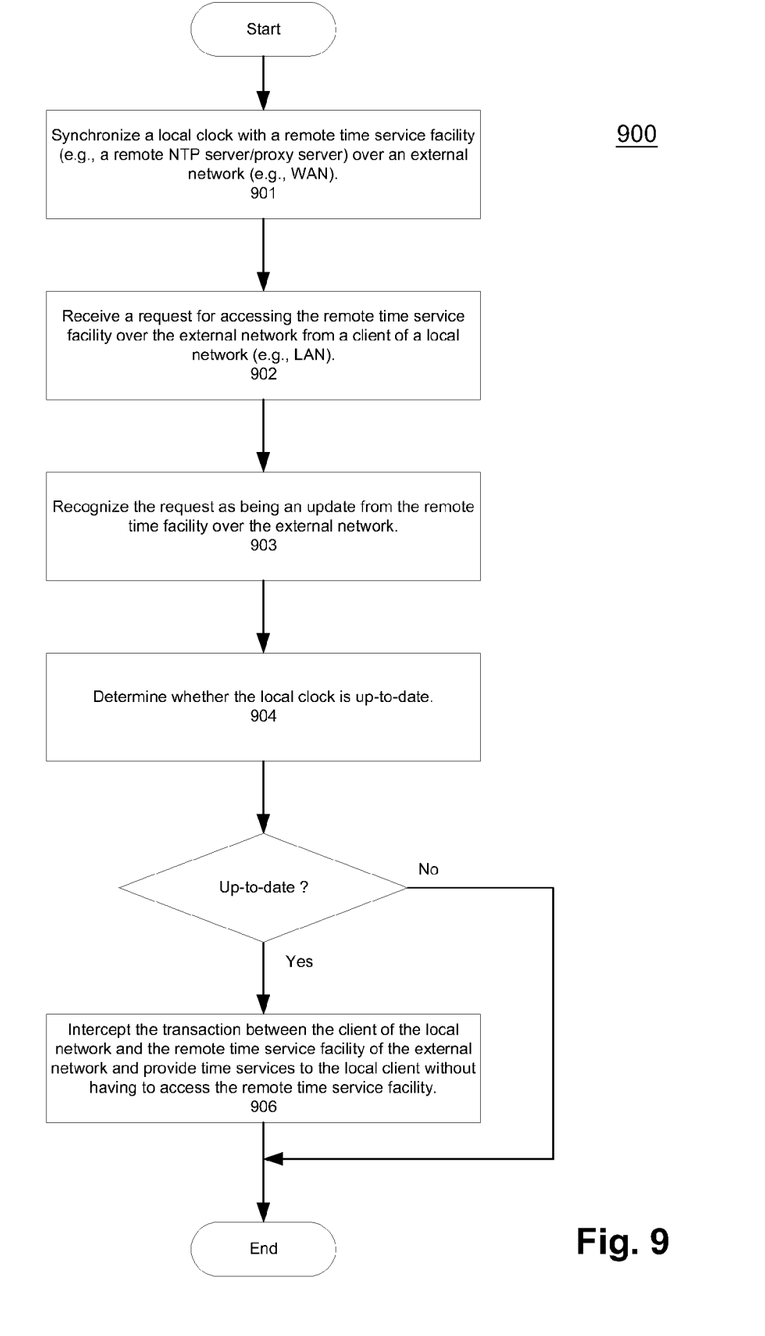
FIG. 9 is a flow diagram illustrating an exemplary process for providing time services to a client over a local area network in accordance with another embodiment of the invention.

FIG. 9 is a flow diagram illustrating an exemplary process providing time services to a client over a local area network in accordance with another embodiment of the invention. Exemplary process 900 may be performed by a processing logic that may comprise hardware (circuitry, dedicated logic, etc.), software (such as is run on a dedicated machine), or a combination of both. For example, the exemplary process 900 may be performed by a gateway device, such as, gateway 201 of FIG. 2 or the access point 301 of FIG. 3.

In one embodiment, exemplary process 900 includes, but is not limited to, intercepting a request from a client of a local network for time services from a remote time service facility over an external network to synchronize a system clock of the client, and providing time service to the client over the local network using a local clock that is synchronized previously without having to access the remote time service facility over the external network, if the local clock is up-to-date.

Referring to FIG. 9, at block 901, a local clock of a gateway device is synchronized with a remote time facility (e.g., an NTP server or proxy server) over an external network (e.g., WAN, Internet). The local clock may be synchronized periodically via a separate connection. Alternatively, the local clock may be synchronized by sharing a connection to the external network of a local client, for example, using operations shown in FIG. 8.

Subsequently, at block 902, a request for accessing a remote time service facility over the external network is received from a client of a local network. At block 903, the request is recognized by the gateway device, for example, based on the communication protocols (e.g., NTP compatible protocols) used in the request. At block 904, the gateway device determines whether the previously synchronized local clock is still up-to-date. If so, at block 906, the gateway device provides time services to the requested client over the local network using the synchronized local clock without having to access the remote time service facility over the external network. Other operations may also be performed.

Figure 7:
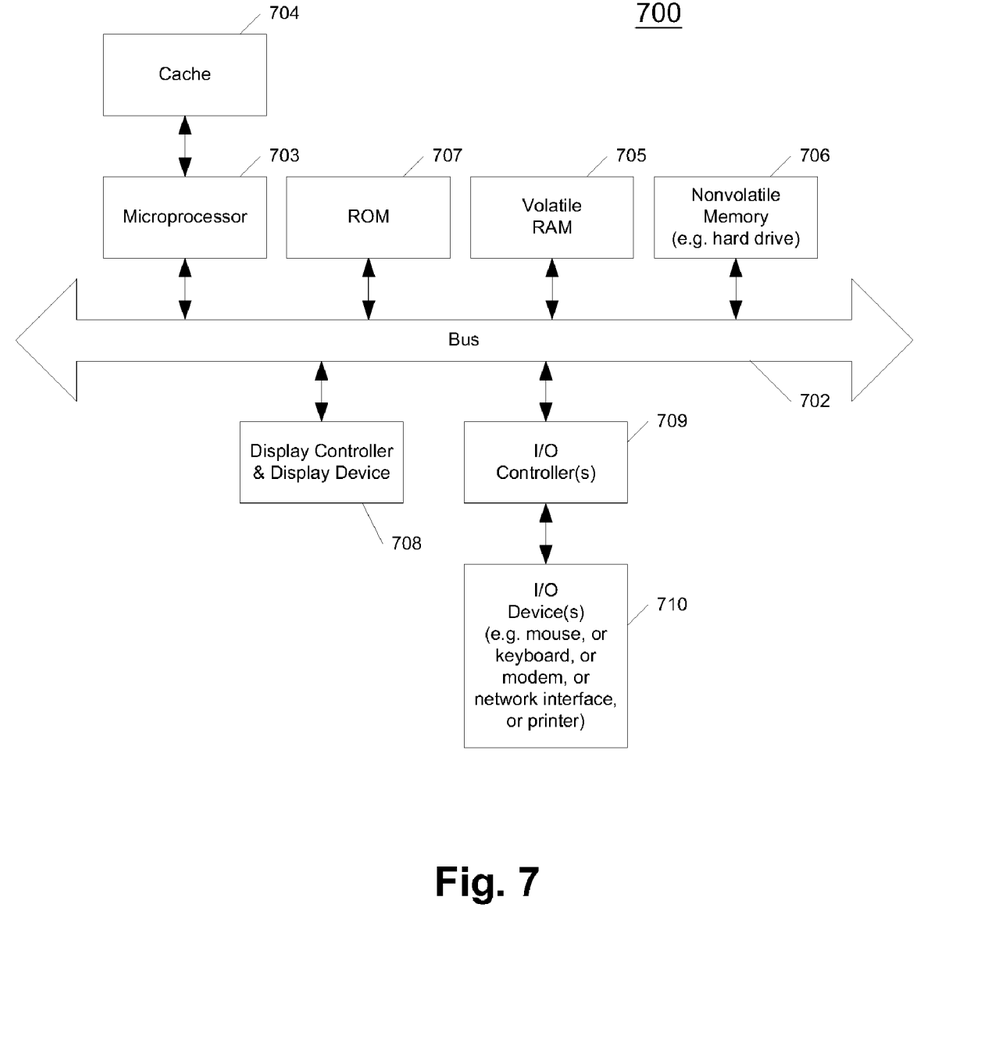
FIG. 7 is a block diagram of a digital processing system which may be used with one embodiment of the invention.

FIG. 7 is a block diagram of a digital processing system which may be used with one embodiment of the invention. For example, the system 700 shown in FIG. 7 may be used as a client computer system such as clients 203-205 of FIG. 2. Alternatively, the exemplary system 700 may be implemented as a gateway device such as gateway 201 of FIG. 2 or the access point 301 of FIG. 3.

Note, that while FIG. 7 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 7 may, for example, be an Apple Macintosh computer or an IBM compatible PC.

As shown in FIG. 7, the computer system 700, which is a form of a data processing system, includes a bus 702 which is coupled to a microprocessor 703 and a ROM 707, a volatile RAM 705, and a non-volatile memory 706. The microprocessor 703, which may be, for example, a PowerPC G4 or PowerPC G5 microprocessor from Motorola, Inc. or IBM, is coupled to cache memory 704 as shown in the example of FIG. 7. The bus 702 interconnects these various components together and also interconnects these components 703, 707, 705, and 706 to a display controller and display device 708, as well as to input/output (I/O) devices 710, which may be mice, keyboards, modems, network interfaces, printers, and other devices which are well-known in the art. Typically, the input/output devices 710 are coupled to the system through input/output controllers 709. The volatile RAM 705 is typically implemented as dynamic RAM (DRAM) which requires power continuously in order to refresh or maintain the data in the memory. The non-volatile memory 706 is typically a magnetic hard drive, a magnetic optical drive, an optical drive, or a DVD RAM or other type of memory system which maintains data even after power is removed from the system. Typically, the non-volatile memory will also be a random access memory, although this is not required. While FIG. 7 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 702 may include one or more buses connected to each other through various bridges, controllers, and/or adapters, as is well-known in the art. In one embodiment, the I/O controller 709 includes a USB (Universal Serial Bus) adapter for controlling USB peripherals. Alternatively, I/O controller 709 may include an IEEE-1394 adapter, also known as FireWire adapter, for controlling FireWire devices.

Thus, methods and apparatuses for synchronizing a system clock of a computer via a local gateway have been described herein. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method performed by a gateway device, comprising:
    intercepting a request to a remote time service facility for time services over an external network from a client of a local network, the time services to synchronize a system clock of the client, the external network not accessible to the gateway device without a network connection to route IP (Internet Protocol) data between the gateway device and the external network;
    recognizing the request for time services received from the client over the local network, wherein the time services are provided to the client over the local network in response to the recognition of the request;
    determining if a local clock is update-to-date, the local clock synchronized previously with the remote time service facility via an IP based network connection over the external network; and
    providing time service to the client over the local network using the local clock without having to access the remote time service facility over the external network, if the local clock is up-to-date.

2. The method of claim 1, wherein the external network comprises a wide area network based on broadband connections.

3. The method of claim 1, wherein the request for time services is recognized based on communication protocols used in the request.

4. The method of claim 1, wherein the local clock is synchronized via a dialup network connection using a modem over the external network.

5. The method of claim 1, wherein the local network is a wireless network and the gateway device is an access point servicing a plurality of clients wirelessly.

6. The method of claim 1, wherein the interception is performed transparently to a user of the client.

7. An access point, comprising:
    a clock synchronizer to periodically synchronize a local clock with a time service facility via an IP (Internet Protocol) based network connection over an external network, wherein the external network is not accessible to the access point without a network connection to route IP data between the access point and the external network;
    a public interface coupled to the clock synchronizer to allow a public client to synchronize a system clock of the public client wirelessly using the synchronized local clock without having to be a member of a local network hosted by the access point; and
    a time service agent coupled to the clock synchronizer to provide time services to one or more members of the local network to synchronize a system clock of the one or more members wirelessly.

8. The access point of claim 7, wherein the external network comprises a wide area network based on broadband connections.

9. The access point of claim 8, wherein the time service agent is to provide time service to the public client wirelessly via the public interface.

10. The access point of claim 8, wherein the public client is prevented from accessing one of the local network and the external network.

11. The access point of claim 7, wherein the public interface only accepts data received from the public client compatible with protocols related to time services.

12. A method performed by a gateway device, comprising:
    receiving a request from a client over a local network for synchronizing data to a resource available on an external network, wherein the external network is not accessible to the gateway device without a network connection to route IP (Internet Protocol) data between the gateway device and the external network;
    forwarding the request to the resource via an IP (Internet Protocol) based network connection over the external network if the resource is available;
    generating within the gateway device synchronization data in response to the request and providing the synchronization data to the client over the local network, if the resource is unavailable; and
    periodically synchronizing the local data with the resource over the external network, wherein the synchronization data is generated based on the synchronized local data.

13. The method of claim 12, wherein the data being synchronized is associated with time services and wherein the resource is a time service facility.

14. The method of claim 12, wherein the local network is a wireless network and wherein the gateway device is an access point serving one or more clients wirelessly.

15. The method of claim 12, wherein the external network comprises a wide area network based on broadband connections.

16. The method of claim 15, wherein the local data is synchronized by sharing network connection to the external network by another client of the local network.

17. A machine-readable non-transitory medium having executable code to cause a machine to perform a method, the method comprising:
   receiving a request from a client over a local network for synchronizing data to a resource available on an external network, wherein the external network is not accessible to the machine without a network connection to route IP (Internet Protocol) data between the machine and the external network;
   forwarding the request to the resource via an IP (Internet Protocol) based network connection over the external network if the resource is available;
   generating within a gateway device synchronization data in response to the request and providing the synchronization data to the client over the local network, if the resource is unavailable;
   periodically synchronizing the local data with the resource over the external network, wherein the synchronization data is generated based on the synchronized local data.

18. The machine-readable medium of claim 17, wherein the data being synchronized is associated with time services and wherein the resource is a time service facility.

19. The machine-readable medium of claim 17, wherein the local network is a wireless network and wherein the gateway device is an access point serving one or more clients wirelessly.

20. The machine-readable medium of claim 17, wherein the external network comprises a wide area network based on broadband connections.

21. The machine-readable medium of claim 20, wherein the local data is synchronized by sharing network connection to the external network by another client of the local network.

22. A gateway device, comprising:
   a client agent to periodically synchronize local data with a resource over an external network, wherein the external network is not accessible to the gateway device without a network connection to route IP (Internet Protocol) data between the gateway device and the external network; and
   a server agent coupled to the client agent to
      receive a request from a client over a local network for synchronizing data to the resource,
      forward the request to the resource via an IP (Internet Protocol) based network connection over the external network if the resource is available, and
      generate synchronization data in response to the request based on the synchronized local data and provide the synchronization data to the client over the local network, if the resource is unavailable.

23. An apparatus, comprising:
   means for receiving a request from a client over a local network for synchronizing data to a resource available on an external network, wherein the external network is not accessible to the apparatus without a network connection to route IP (Internet Protocol) data between the apparatus and the external network;
   means for forwarding the request to the resource via an IP (Internet Protocol) based network connection over the external network if the resource is available; and
   means for generating within a gateway device synchronization data in response to the request and providing the synchronization data to the client over the local network, if the resource is unavailable.

24. A method performed by a gateway device, comprising:
   providing a host configuration to a client of a local network to specify whether to access a local time service agent of the gateway device or to access a remote time service facility over an external network, in order to synchronize a system clock of the client of the local network, wherein the external network is not accessible to the gateway device without a network connection to route IP (Internet Protocol) data between the gateway device and the external network;
   directing time service requests of the client to the local time service agent of the gateway device in response if the client is configured to access the local time service agent to synchronize the system clock, the local time service agent to synchronize with the remote time service facility via an IP (Internet Protocol) based network connection over the external network; and
   providing time services to the client over the local network using a local clock of the gateway device without having to access the remote time service facility over the external network.

25. The method of claim 24, further comprising providing a host configuration route for the client to access the remote time facility over the external network to synchronize the system clock of the client, if the client is configured to access the remote time service facility to synchronize the system clock.

26. The method of claim 24, wherein the client is configured whether to access the local time service agent or the remote time facility by a dynamic host configuration agent of the gateway device.

27. The method of claim 26, wherein the dynamic host configuration agent of the gateway device comprises a DHCP (Dynamic Host Configuration Protocol) server to provide dynamic host configuration to one or more clients over the local network.

28. The method of claim 24, wherein the local time service agent of the gateway device is an NTP (Network Time Protocol) compatible server.

* * * * *